UNITED STATES PATENT OFFICE.

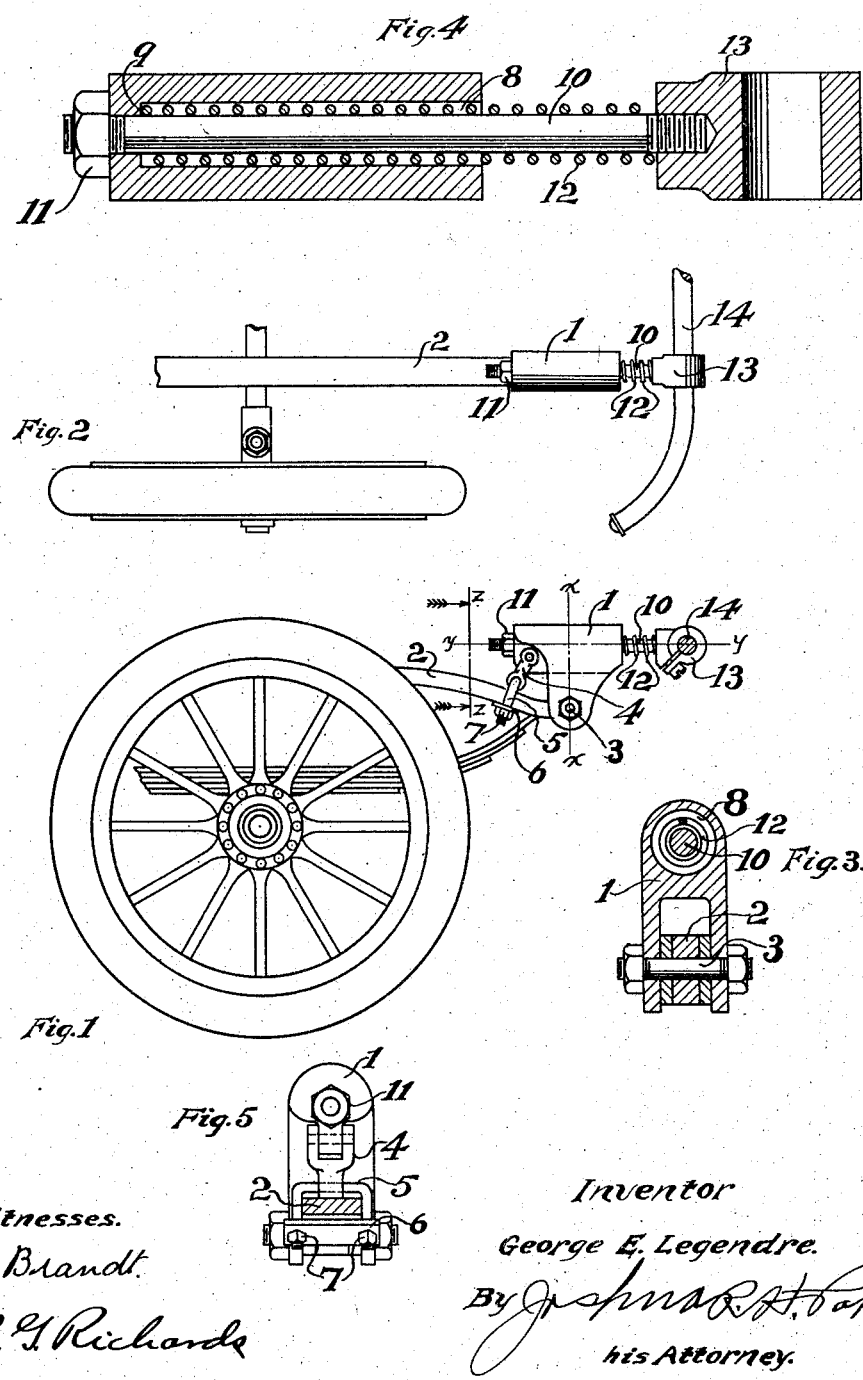

GEORGE E. LEGENDRE, OF CHICAGO, ILLINOIS.

AUTOMOBILE-FENDER.

1,055,057.

Specification of Letters Patent.

Patented Mar. 4, 1913.

Application filed January 19, 1912. Serial No. 672,161.

*To all whom it may concern:*

Be it known that I, GEORGE E. LEGENDRE, a subject of the King of England, and a resident of the city of Chicago, county of Cook, and State of Illinois, have invented certain new and useful Improvements in Automobile-Fenders, of which the following is a specification.

My invention relates to improvements in fenders for automobiles, and has for its object the production of a device of this character which is of simple construction and efficient in operation and may be readily attached to any ordinary automobile.

The invention consists in the combinations and arrangements of parts hereinafter described and claimed.

My invention will be best understood by reference to the accompanying drawings forming a part of this specification, and in which—

Figure 1 is a side elevation, partially in section, of the forward portion of an automobile equipped with a fender embodying my invention, Fig. 2, a partial top plan view corresponding with Fig. 1, Fig. 3, an enlarged vertical section taken on line *x—x* of Fig. 1, Fig. 4, an enlarged horizontal section taken on line *y—y* of Fig. 1, and Fig. 5, an enlarged vertical section taken on line *z—z* of Fig. 1.

The preferred form of construction, as illustrated in the drawings, comprises two heads 1 made U-shaped at their lower portions to embrace the forward ends of the ordinary side bars 2 of an automobile. Heads 1 are pivotally secured in position by means of bolts 3, as indicated in Fig. 3. Each of the heads 1 is provided with a brace 4 which is pivoted to the rear portion thereof as indicated and carries at its free end a U-shaped clamping member 5 adapted to embrace the corresponding side bar 2, as shown in Fig. 5. A perforated clamping bar 6 is placed over the ends of the limbs of member 5 and nuts 7 are employed to secure member 5 in position, as shown. In their upper portions, heads 1 are provided with horizontally extending sockets 8 having stop shoulders 9 at their inner ends. Plunger rods 10 are passed through the sockets 8 and provided with adjusting nuts 11 at their inner ends. A compression spring 12 is placed in each of the sockets 8 around the corresponding rod 10 and serves to hold said plunger rods normally in forward position. At its outer end, each of the rods 10 carries a clamping member 13 adapted to receive and clamp the usual fender bar 14, as indicated.

By this construction it will be seen that the heads 1 and consequently the fender bar 14 may be readily secured to any of the usual forms of automobile, the pivotal members 4 and clamping member 5 allowing for adjustments to accommodate different drop curvatures at the outer ends of the side bars 2. The device will be found to be easily and readily applied and durable and efficient in service.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claim.

Having described my invention, what I claim as new and desire to secure by Letters Patent, is:

The combination with the side bars of an automobile, of spring socket heads, each having two arms to engage both sides of one of said side bars; a perforated ear on each of said spring socket heads; a clamp secured to each of said side bars; a bifurcated link having its bifurcated end pivotally connected with one of said ears and its other end pivotally connected with said clamp; plunger rods operatively mounted in said spring socket heads; springs in said spring socket heads and around said plunger rods; and a fender carried by said plunger rods, substantially as described.

In testimony whereof I have signed my name to this specification in the presence of two subscribing witnesses.

GEORGE E. LEGENDRE.

Witnesses:
 JOSHUA R. H. POTTS,
 HELEN F. LILLIS.

Copies of this patent may be obtained for five cents each, by addressing the "Commissioner of Patents, Washington, D. C."